UNITED STATES PATENT OFFICE.

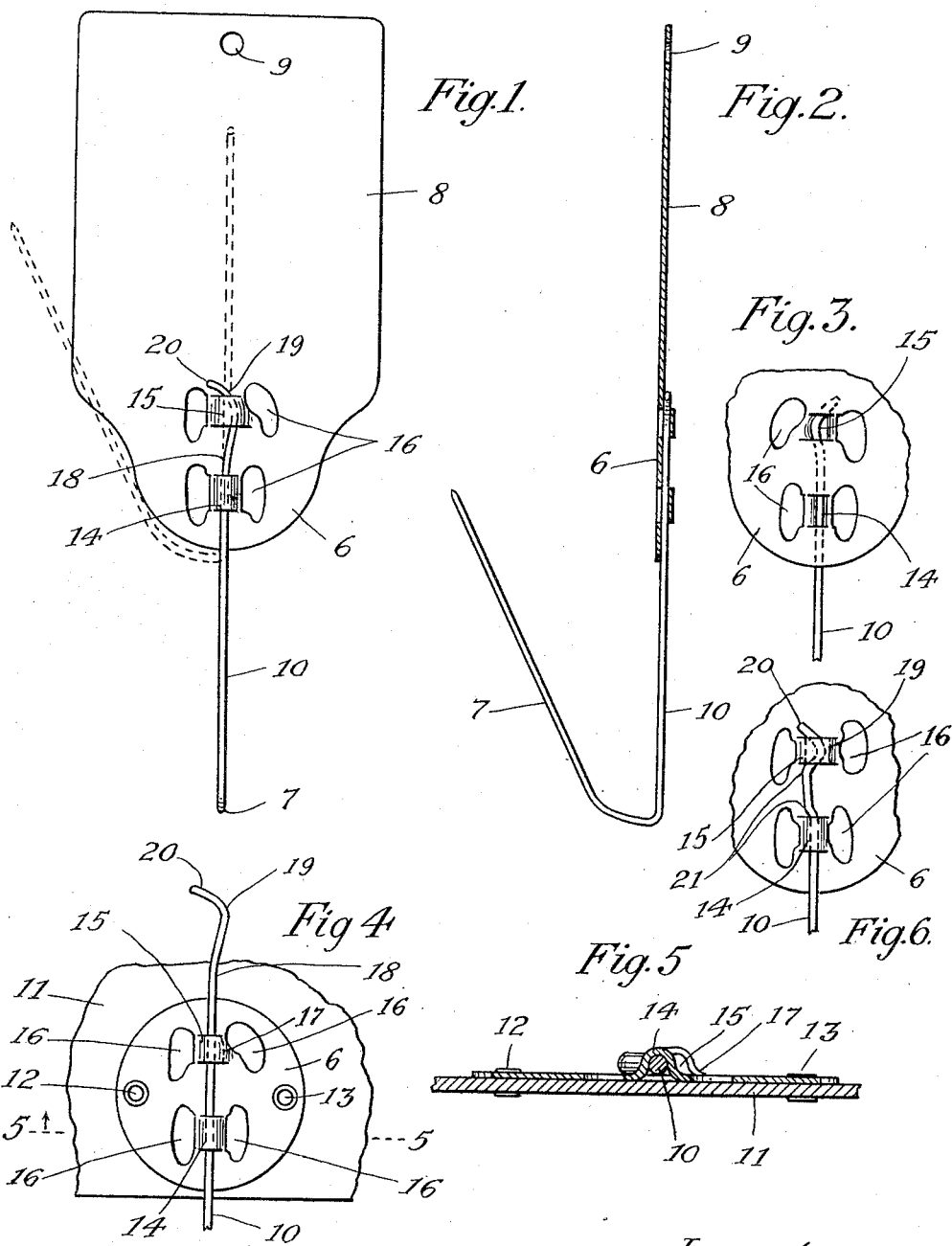

EDWARD C. QUIMBY AND CHARLES ANDERSON, OF MINNEAPOLIS, MINNESOTA; SAID ANDERSON ASSIGNOR TO SAID QUIMBY.

BILL-HOOK.

1,007,731.　　　　Specification of Letters Patent.　　Patented Nov. 7, 1911.

Application filed February 16, 1911. Serial No. 608,934.

*To all whom it may concern:*

Be it known that we, EDWARD C. QUIMBY and CHARLES ANDERSON, citizens of the United States, residing at Minneapolis, in the county of Hennepin and State of Minnesota, have invented certain new and useful Improvements in Bill-Hooks, of which the following is a specification.

Our invention relates to a new and improved form of bill-hook, in which the hook is movably secured in a holder formed of a single plate of material, which may itself provide suspending means for the hook and a surface upon which advertising matter may be printed, if desired, or said plate may be secured to an ordinary advertising card, said hook being movable on said plate so that in one position it may be folded substantially into the plane of the plate or card for shipment, in another position being held locked against sliding or rotating movement on said plate with the hook extending outwardly at right angles to said plate.

Figure 1 is a plan view, showing a large sized plate which may be used for advertising purposes, the hook being indicated in dotted lines in its folded position. Fig. 2 is a section longitudinally through the center of the same. Fig. 3 is a fragmentary plan view taken from the opposite side from that of Fig. 1. Fig. 4 is a plan view showing how the device may be attached to an advertising card. Fig. 5 is a transverse section on lines 5—5 of Fig. 4. Fig. 6 is a plan view of a modification.

The device of our invention comprises but two parts,—a plate 6, which may be of tin or analogous material having sufficient rigidity to adapt same to the stamping operations performed thereon, and a bill-hook 7 movably secured thereto. The plate 6 may be provided with an extended portion 8, as shown in Figs. 1 and 2, having an aperture 9 for suspending the same in desired position, said extended portion 8 serving to receive directly thereon advertising matter, where it is desired to make such use of the article; or the plate 6 may, as shown in Figs. 4 and 5, be circular in form and of such size merely as to provide the holding means for a shank 10 of the hook 7, in which case the plate 6 may be attached to a sustaining advertising card 11 by means of eyelets 12 extending through apertures 13 in said plate 6.

The holding means for the shank 10 of the hook 7 consists of two straps 14 and 15, respectively, stamped directly from the material of which the plate 6 is formed so as to extend above the plane of the face of the plate 6 and leave room beneath said straps and said plate to receive and hold said shank while permitting the same to move longitudinally between the plate and said straps. In punching up these straps it has been found desirable to remove a portion of the material at either side of said straps, thus forming apertures 16 in the plate 6. The strap 14 at the hook side of the plate 6 is shaped so as to surround the shank 10 with walls in parallel relation thereto, as shown in Fig. 5. One of the walls of the strap 15 is correspondingly positioned in line with one wall of the strap 14. The other wall of the strap 15 is, however, offset relatively to the corresponding wall of the strap 14 and forms an angle therewith and an acute angle with the surface of the plate 6, as clearly indicated at 17 in Fig. 5. The shank 10 is slightly bent at 18 in a plane at right angles to the plane of the hook 7 and is more sharply bent at 19 in the reverse direction, the bend 19 thus being offset from the plane of the hook 7 and shank 10 while the end of said shank is extended so as to form a further offset portion 20 in the same plane as the bend 19 but extending to the opposite side of the center of the shank 10. By means of this arrangement, when the hook 7 is turned at right angles to the plane of the plate 6 and the shank 10 is thrown down beneath the straps 14 and 15 the offset curved portion 19 of said shank will engage the offset portion 17 beneath the strap 15, especially the acute angle between said strap and the plate 6, with the result that the hook will be effectively locked against longitudinal movement beneath the straps, and also, by reason of the contact of the offset end 20 with the plate 6, against rotation about said shank 10.

In the modification shown in Fig. 6 the strap 15 is formed with parallel walls as in the case of the strap 14, but the opening formed by the strap 15 is wider than that of the strap 14 so that one wall of the opening formed by the strap 15 is offset from the line of the corresponding wall of the opening formed by the strap 14. The shank 10 of the hook 7 has a slight bend 21 in a plane at right angles to the plane of said shank and hook but in opposite direction from the bend 18, so as to form a hump on the shank 10 of the proper size to register between the adjacent alining walls formed by the straps 14 and 15. In this form when the hook is rotated to bring the same at right angles to the plate and the shank is drawn downward through the straps the bend 21 will coöperate with the inner edge of the strap 14, the bend 18 coöperating with the corresponding edge of the strap 15 so as to lock the hook from longitudinal movement in either direction on said plate. At the same time the bend 19 in contact with the offset wall 17 of the strap 15 and the further offset end portion 20 of the wire in contact with the plate and beneath the wide opening formed by the strap 15, will effectively prevent rotation of the hook about its shank.

In use the hook will be pressed upward and rotated to bring the same nearly into the plane of the advertising plate or card for shipment, but can readily be drawn down into locking position whenever it is desirable to hang up the bill-hook for ordinary use.

Our bill-hook, consisting of but two pieces, each of which can be automatically formed in a single operation, can be manufactured cheaply. When these parts are once assembled they cannot come apart, although the hook may be placed in either its shipping or operative position with respect to the plate or card with the utmost ease. Its simplicity is apparent. When the hook is drawn down into operative position it is locked not only against further downward movement and side swinging movement, but also against upward movement of the wire. Metal works against metal, and the parts permanently retain their shape and relative position, so that it can not get out of order. Furthermore, since the bill-hook proper and the part for holding the same are entirely self contained and do not in any respect depend upon the advertising card to which they may be attached, it is capable of manufacture apart from said advertising card. This is of material advantage, as it frequently happens that printing establishments without facilities for manufacturing metal parts can handle advantageously orders in which such parts can be obtained ready for assembling with the printed matter.

It is to be noted that the formation of two straps to constitute a holding and locking means is an essential feature of our invention. In either of the forms shown it is the coöperation of both straps with the shank of the wire which effects the locking operation. The wire must be permitted a certain amount of spring in being drawn down into locking position, and this spring is made possible by the straps being somewhat widely separated which allows room for such spring action.

We claim:

1. A bill-hook comprising a plate, a pair of straps struck up from said plate and forming alining openings, one of said straps being formed with a portion offset from the line of said openings, and a single wire movably held on said plate by said straps and bent in one plane to form a hook and having at the end thereof away from said hook means adapted to coöperate with the plate and said offset portion of the strap to lock the hook in operative position on the plate.

2. A bill-hook comprising a plate, a pair of straps struck up from said plate and forming alining openings, one of said straps being formed with a portion offset from the line of said opening, so that the wall of said offset portion is angularly disposed with respect to said line, and a single wire movably held on said plate by said straps and bent in one plane to form a hook and having at the end thereof away from said hook means adapted to coöperate with the plate and said angularly disposed offset portion of the strap to lock the hook in operative position on the plate.

3. A bill-hook comprising a plate, a pair of straps struck up from said plate and forming alining openings, a single wire movably held on said plate by said straps and bent to form a hook, and means on the end of the wire away from the hook adapted to coöperate with both said straps, whereby said hook is locked on the plate in operative position.

4. A bill-hook comprising a plate, a pair of straps struck up from said plate and forming alining openings, a single wire movably held on said plate by said straps and bent to form a hook, said wire being formed with a bend at right angles to the plane in which the hook is bent and adapted to coöperate with both said straps, whereby said hook is locked on the plate in operative position.

5. A bill-hook comprising a plate, a pair of straps struck up from said plate and forming alining openings, one of said straps being formed so as to form an opening wider than that formed by the other and offset at one side from the line of said openings, a single wire movably held on said plate by said straps and bent to form a hook, said wire being formed with a bend at right angles to the plane in which the hook is bent and adapted to coöperate with both said straps, whereby said hook is locked on the plate in operative position.

6. A bill-hook comprising a plate, a pair of straps struck up from said plate and forming alining openings, one of said straps being formed so as to form an opening wider than that formed by the other and offset at one side from the line of said openings, a single wire movably held on said plate by said straps and bent to form a hook, said wire being bent in a plane at right angles to the plane in which the hook is bent so as to form an offset on both sides of the axis of said wire, one of said offsets being adapted to coöperate with both straps to lock the wire from longitudinal movement in either direction, the other offset being adapted to coöperate with the strap forming said wider opening and with said plate to lock the wire against rotation.

7. A bill-hook comprising a plate, a pair of straps struck up from said plate and forming alining openings, one of said straps being formed with a portion offset from the line of said openings, and a single wire movably held on said plate by said straps and bent in one plane to form a hook, said wire being further bent at the end away from the hook in a plane at right angles to the plane in which the hook is bent so as to form a portion offset at each side of the line of said wire, said offset portions of the wire being adapted to coöperate with said offset portion of the strap and with the plate to lock the hook in operative position on the plate.

8. A bill-hook comprising a plate having pairs of openings punched therein, the plate being transversely cut between each pair of said openings but not to intersect the openings so as to form straps, said straps being struck up and the openings expanded so that the straps form alining passages arched above the plane of the plate, a single wire movably held on said plate by said straps and bent in one plane to form a hook and having at the end thereof away from said hook means adapted to coöperate with the plate and said straps to lock the hook in operative position on the plate.

In testimony whereof we have affixed our signatures in presence of two witnesses.

EDWARD C. QUIMBY.
CHARLES ANDERSON.

Witnesses:
F. A. WHITELEY,
H. A. BOWMAN.

---

Copies of this patent may be obtained for five cents each, by addressing the "Commissioner of Patents, Washington, D. C."